INTRUDER ALARM SYSTEM WITH SUPERVISION AND TEST

Filed July 12, 1968 2 Sheets-Sheet 1

INVENTOR.
L. A. GUTHART
BY
Sommers & Sommers
ATTORNEYS

Dec. 15, 1970 L. A. GUTHART 3,548,401

INTRUDER ALARM SYSTEM WITH SUPERVISION AND TEST

Filed July 12, 1968 2 Sheets-Sheet 2

INVENTOR.
L. A. GUTHART
BY
Sommers & Sommers
ATTORNEYS

United States Patent Office 3,548,401
Patented Dec. 15, 1970

3,548,401
INTRUDER ALARM SYSTEM WITH SUPERVISION AND TEST

Leo A. Guthart, Old Westbury, N.Y., assignor to Alarm Device Manufacturing Company, a division of Pittway Corporation, Carle Place, N.Y., a corporation of Pennsylvania Filed July 12, 1968, Ser. No. 744,460
Int. Cl. G08b *13/08, 29/00*
U.S. Cl. 340—274 10 Claims

ABSTRACT OF THE DISCLOSURE

An intruder alarm system at a subscriber's premises includes a motor for driving a coded transmitter which sends a signal to a central office when the circuitry in the premises has been prepared for operation and the subscriber is opening the exit door to leave the premises, when the door is closed and when a supervisory circuit guarding the premises is broken as when an intruder enters the premises via the exit door or other guarded entrances into the premises. Under the last condition, a local alarm is set into operation at the end of the coded transmission to the central office.

The invention relates to the transmission of a coded signal from a subscriber's station to a central office in the event of a selected abnormal occurrence taking place after an alarm mechanism at the subscriber's station has been tested and other preparations have been set.

In particular, the invention relates to an intruder operated alarm system.

While the transmission of the coded signal is usually via telephone lines, it should be understood that the signals may be transmitted in any other fashion as by use of radio frequency waves or modulated light waves.

The alarm system works on a principle called the McCullough loop wherein several subscribers share a common telephone line (or a radio frequency band) and wherein the several subscribers are differentiated by the nature of the code transmitted at the subscriber's station.

In monitoring an alarm system location, there are a number of functions to be performed by the alarm system transmitter. In the prior art, a system is utilized wherein two rounds of signals are sent over a telephone line by the transmitter to a central office when a subscriber closes his premises, as in the evening. One of these rounds is sent when the subscriber sets his alarm when he believed he was ready to leave. Then later, when he actually did leave his premises, a second round is sent signifying that he had left; these two rounds signified to an attendant at the central station that the closing of the premises had been a proper one. Obviously when the first round came in at the central office, it was necessary that the attendant pay attention to that particular subscriber from the time the first round came in until the second round was transmitted. In the event there was a time delay between the subscriber's setting the alarm, as when he was answering a telephone call, and actually exiting, the central office help was tied up for that period of time.

It is an object of this invention to provide an alarm system of the character described wherein the attention of an attendant to a particular subscriber's station for a prolonged period of time is very much reduced since, in accordance with this invention, the delay would be only the time taken for a subscriber to open an exit door, pass out of his premises and again close the exit door. These are events requiring but a few seconds.

Under alarm conditions, as when an intruder opens the door or other electrically guarded access means to the premises, there is normally sent to the central office three rounds of coded signals, sometimes in the prior art, accompanied by the simultaneous ringing of an alarm bell at the local premises. However, the simultaneous ringing of the local alarm is undesirable from the standpoint of the apprehension of an intruder, since such ringing would induce the intruder to make a quick get away, wherefore it is a further object of this invention to delay the broadcasting of a local alarm until after the transmission of the multiple number of coded alarms has almost been completed.

The invention does not utilize mechanically activated micro switches and cams to govern the functions of the transmitter. It utilizes a rotary switch and motor principle. Cams and micro switches have traditionally been a tremendous source of trouble and malfunction to the alarm industry. They continually go out of adjustment and alignment and cause great difficulty in transmitting good and consistent telephone line signals. They require precise adjustment in manufacture and in service. It is a further object of the invention to eliminate this troublesome feature and, by using a specially designed rotary switch and motor to give a level of reliability that cannot be found with mechanically activated switches and cams.

How these and other objects are obtained will become apparent after a consideration of the following specification when read in conjunction with the accompanying drawings in which.

Figure 5:
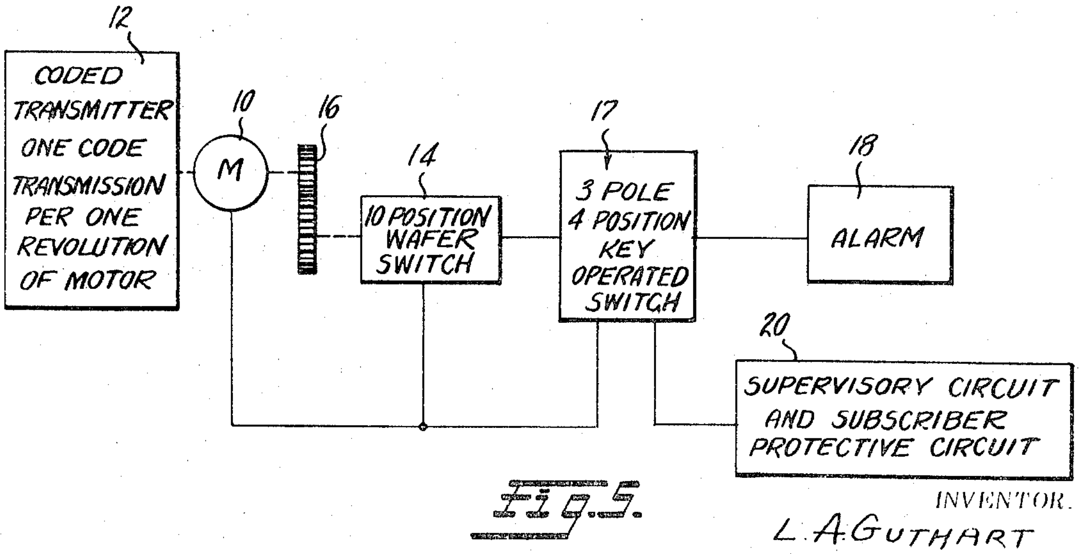
FIG. 5 is a diagram illustrating very generally the relationship of the units employed in the alarm system.

Now referring to the drawings in greater detail, in FIG. 5 there is shown an electric motor 10 of a conventional character which for each revolution drives a transmitter 12. For each revolution of the motor, the transmitter sends out a coded message. The specific character of the transmitter is unimportant insofar as this invention is concerned. It may be a land line transmitter sending a taped coded message for each rotation of the motor or a radio transmitter of any character or an oscillating mirror or a pulsed laser or any other means.

The motor 10 also drives a switch. In a preferred form of the invention, the switch is an intermittently driven wafer stepping switch 14 driven from the motor by reduction gearing as by a 1 to 5 reduction gearing 16. Also there is provided in the system a key controlled switch 17, a local alarm 18, a supervisory and subscriber's protective circuit 20, and electrical connections between the motor, the wafer switch, the key operated switch, the alarm and the supervisory and subscriber's protective circuit.

Figure 3:
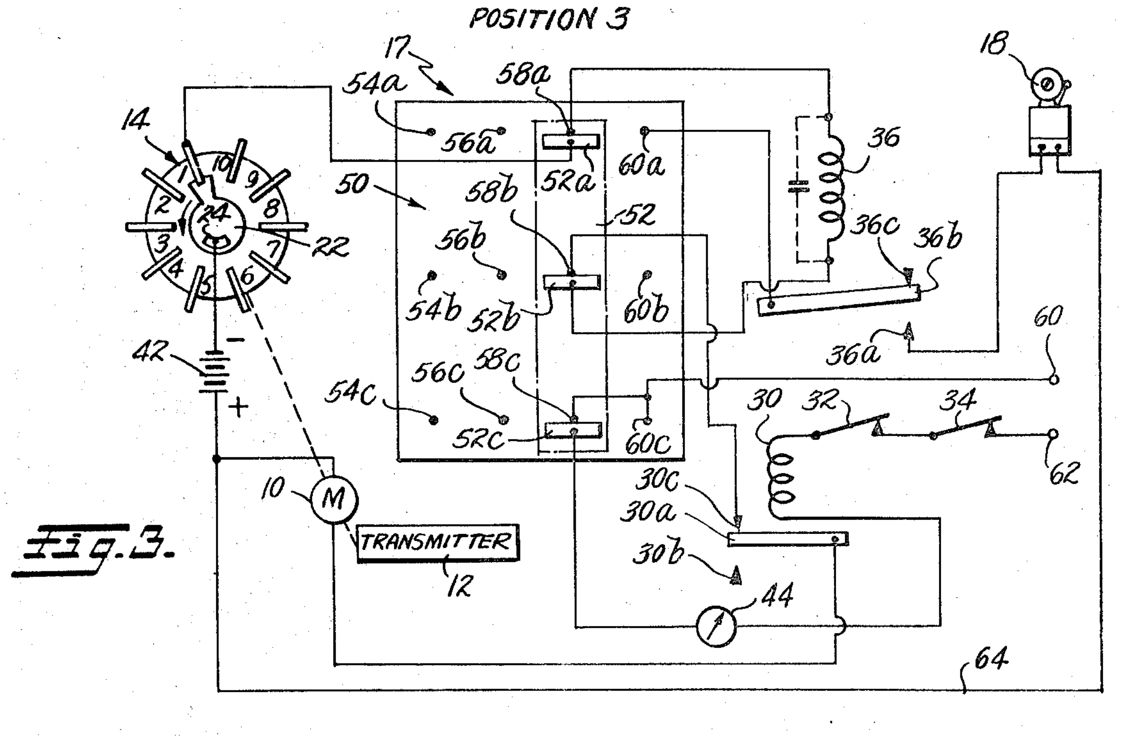
FIG. 3 is a circuit diagram showing the position of parts when the key moves the switch to a number 3, supervisory test and local condition test position.
Figure 4:
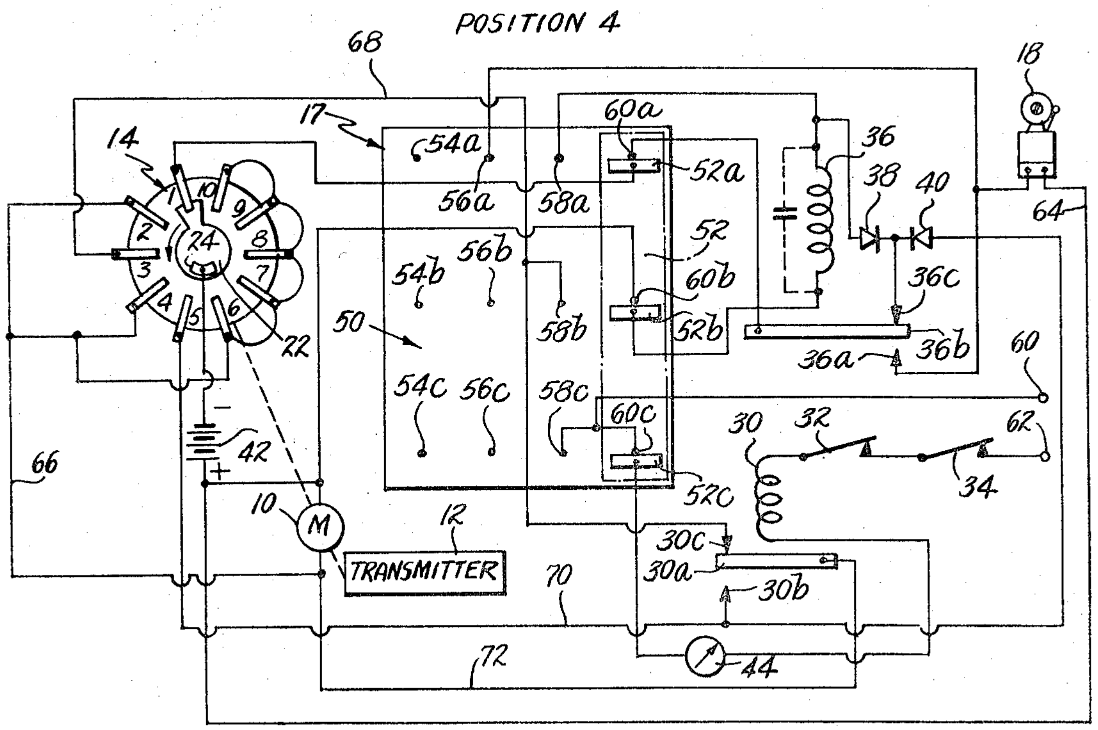
FIG. 4 is a circuit diagram of the entire system showing the key operated switch in a number 4, alarm set position.

The wafer switch and all of its connections is shown in FIG. 4 and is of a conventional type. It is provided with 10 contacts equally spaced apart circumferentially and a rotor 22 having an arcuate lobe of an extent just short of spanning any two adjacent contacts. The normal rest position of parts is shown in FIGS. 1 to 4 with the lobe midway of contact 1. The rotor 22 is always connected with a wiper 24.

The key operated switch may, for example, be a barrel which can be rotated only by the insertion of a proper key, the barrel carrying three wipers constituting the poles of a three pole, four position switch, the barrel revolving in a cylinder having three sets of contacts arranged longitudinally of the barrel, each set being preferably located 90° from its adjacent set, although it will be obvious that other circumferential distances may be employed. The barrel and cylinder may be fitted with appropriate spring pressed ball and indentation means, respectively, to yieldingly restrain the barrel in each of its four positions. The barrel switch is not illustrated as such since the specific form of switch is not the essence of the invention. The local alarm preferably comprises a bell, although it is obvious that a light, a siren or other means could be employed insofar as this invention is concerned. In further cooperation with the alarm system is the supervisory system from the central office and involving the use of a relay 30 (FIGS. 3 and 4) whose energizing coil is in series with the window or like switch or switches 32 and exit door switch 34. The supervisory system involving the relay must be energized at the central office for proper subsequent setting of the entire alarm system. Also involved in the alarm system is another local alarm control relay 36 and associated diodes 38 and 40 (FIG. 4) as well as a direct source of voltage here indicated as a battery 42. As an accessory device an ammeter 44 is provided.

In FIGS. 1 to 4 the stationary cylinder or stator 50 of the switch 17 is shown in developed form while the rotor is indicated as a moving bar 52 (shown in dotted lines) rigidly carrying three spaced apart parallel poles **52*a*, 52*b*, and 52*c*. The stator carries sets of contacts 54*a*, 54*b* and 54*c*; 56*a*, 56*b*, and 56*c*; 58*a*, 58*b*, and 58*c*; and sets of contacts 60*a*, 60*b*, and 60*c***.

Figure 1:
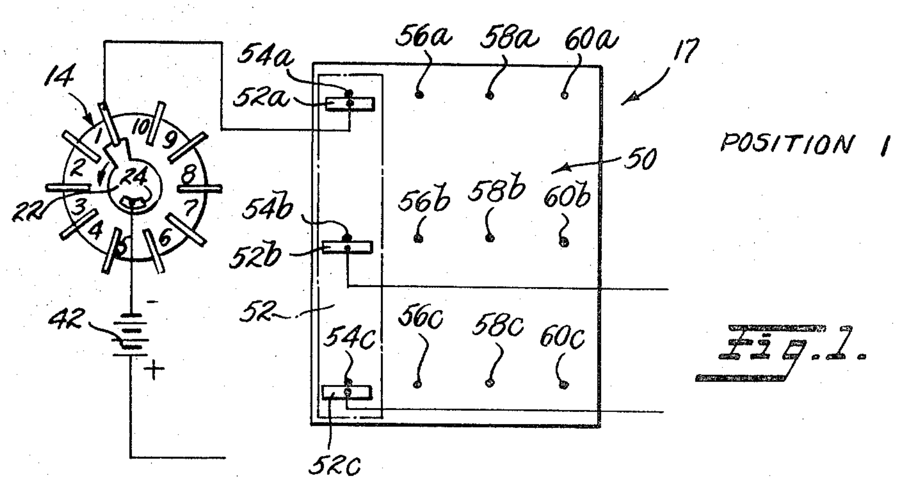
FIG. 1 is a circuit diagram showing the condition of various parts of the system when a key operated switch is at an off or number 1 position.

FIG. 1 shows what is essential to an understanding of the condition of parts when the alarm system is in a first or off position. The contacts **54*a*, 54*b*, and 54*c* are disconnected from any parts and therefore no current flows thru any of the poles 52*a*, 52*b*, or 52*c*** of the switch.

Figure 2:
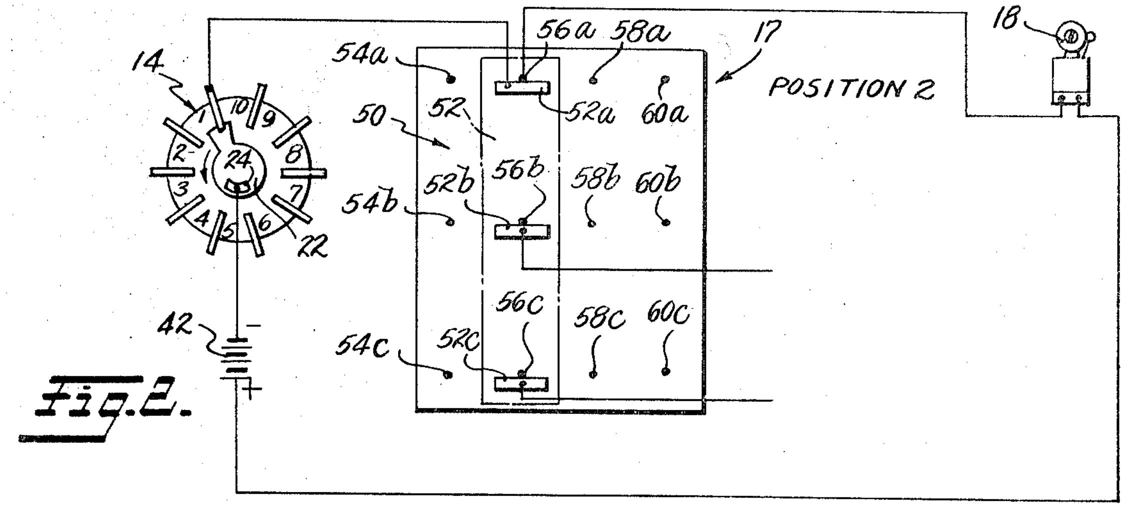
FIG. 2 is a circuit diagram showing the position of parts when the key moves the switch to a number 2, alarm testing position.

In FIG. 2 there are shown the essential parts when the key has been inserted in the barrel and the rotor turned to the second or local alarm test position. The only connection to the second row of contacts is via contact **56*a*. A circuit is now completed from the negative side of battery 42 via the rotor 22 of wafer switch 14, contact 1 thereof, pole 52*a*, switch contact 56*a* to the bell 18 and from the bell back to the positive pole of battery 42**. The ringing of the bell apprises the subscriber that the local alarm is in proper condition for operation.

When the key is turned to the third or supervisory test position, the essential parts are as shown in FIG. 3. When the barrel is turned to this position, the coil of the relay 36 is energized imposing a break at switch contact **36*a* in the wiring to alarm 18 so that when the barrel is rotated to its fourth position, under proper operating conditions, the alarm 18 will not be energized. This will become clearer upon further reading of the specification. However, the alarm system will not be so preconditioned, i.e., rendered inoperative, unless the supervisory system is properly closed. In order that the circuit to the coil 36 be closed, it is necessary that the supervisory system be in readiness for operation. The supervisory system involves a closure of the circuit having a power source, an indicator at the central station and connecting wires from the central station to the terminals 60 and 62 at the local subscriber's station. When this circuit is closed and the door 34 and window 32 are closed and with the barrel switch in the position of FIG. 3, current will flow from the central station to the terminal 62, thence thru the switches 34 and 32 and through the relay 30, local indicator 44, switch pole 52*c*, contact 58*c*, terminal 60, and back to the central station. The relay 30 will remove moveable contact 30*a* from contact 30*b* and close the contact 30*a* onto contact 30*c*. Current will now flow from the negative side of battery 42, through the rotor of wafer switch 14, contact 1 of the wafer switch, switch pole 52*a*, contact 58*a*, relay coil 36, switch pole 52*b*, contact 58*b*, contacts 30*c* and 30*a*, motor 10 and to the positive side of the battery. Because of the ohmic resistance of coil 36, the armature of motor 10 will not rotate. The energization of coil 36 has caused its armature to maintain open the circuit to the bell at the contact 36*a*. Were this contact 36*a* closed, current to the bell when the barrel switch is moved to the fourth position would have had the following path: From the battery through the wafer switch at its contact 1, to switch pole 52*a*, contact 60*a*, armature 36*b* of relay 36, contact 36*a*, bell 19, and wire 64 back to the battery. Therefore should the bell ring when the barrel switch is turned to position 4, it is an indication that there is a break in the supervisory circuit. However in a setting up operation, the bell circuit is not only opened at contact 36*a* by energization of relay 36, but is maintained open by the last circuit just described. While the switch poles are moving from position 3 to position 4, the inherent capacity of coil 36 makes it slow to release the armature wherefore the contact 36*a*** remains open.

When the local subscriber has ascertained that the bell does ring at position 2 of the barrel switch and does not ring at position 3 of the barrel switch, he knows that the supervisory circuit is in order and that the window or other guarded areas are closed, as is the exit door. He is now ready to leave the premises. Preparatory thereto, he turns the barrel switch to position 4. The parts of the apparatus in this position of the barrel switch is shown in FIG. 4. As he moves the barrel switch from position 3 to position 4, as explained heretofore, coil 36 does not release its armature because of the inherent coil capacitance coacting with the induction of the coil introducing a delay in the release of the armature and the time for movement of the barrel switch from position 3 to position 4 being of short duration.

In position 4, coil 36 is maintained energied as follows: Current flows from the negative pole of the battery 42, through wafer switch 14 and terminal 1 to pole **52*a*, contact 60*a*, contacts 36*b* and 36*c* of relay 36, diode 38, relay coil 36, pole 52*b*, contact 60*b* and to the positive pole of battery 42**. Parts are now ready for central notification that the subscriber is about to leave the premises. However, the central office is not made aware of the fact until the exit door is opened, preparatory to leaving the premises.

TRANSMISSION OF ROUND ONE

When the door 34 is opened one round of information is transmitted to the central office by reason of one rotation of the armature of motor 10, which armature drives the signal transmitter thru one round. When the door 34 is opened, relay 30 becomes deenergized releasing its armature whereby contact **30*a* makes contact with contact 30*b*. Current now flows through the motor 10 as follows: From the negative pole of battery 42, through contact 1 of water switch 14, switch pole 52*a*, contact 60*a*, armature contact 36*b*, contact 36*c*, diode 40, contact 30*b* of relay 30, armature contact 30*a*, motor 10 and to the positive side of battery 42. The motor 10 now starts, transmitting a signal via the transmitter 12 to the central office and alerting an operator thereat, the motor also rotating, counterclockwise, rotor 22 of water switch 14. The motor soon causes the leading edge of the blade of the rotor 22 to engage contact 2 of the wafer switch while this blade clears contact 1. However the motor is now kept running for one cycle regardless of the condition of relay 30, since the circuit to the motor is completed via wire 66 interconnecting contact 2 of the wafer switch and the motor. The motor is kept energized until the trailing end of the rotor blade leaves contact 2. This occurs after a full 360° rotation of the motor armature and the rotor blade is centered on contact 3 of the wafter switch. When the rotor blade leaves contact 1, the circuit to relay 36 via diode 38 is broken and the armature 36*b* drops, closing on contact 36*b* of the bell circuit. The bell circuit, however, is open until the lobe of rotor 22 again contacts contact 1** of the wafer switch.

TRANSMISSION OF ROUND TWO

When the exit door is closed, relay 30 is again energized and the armature contact 30*a* engages contact 30*c*. Contact 30*c* is connected to terminal 3 of the wafer switch by wire 68. Now the alerted operator at the central station will receive a second round of signals from the signal transmitter 12 by reason of another single rotation of the armature of motor 10. The motor is energized by current flow from the negative side of battery 42 to contact 3 of the wafer switch, line 68, contacts 30*c*, 30*a*, line 72, motor 10 and the positive side of battery 42. The wafter switch rotor starts rotating. When the rotor reaches terminal 4 of the wafer switch another by-pass circuit is established via wire 66 that continues the rotation of the motor 10 until the trailing edge of the rotor lobe or blade leaves terminal 4. The motor cannot now operate until an alarm condition drops out relay 30 to again complete the circuit through terminal 5 of the wafer switch. The system is now primed to detect the entrance of an intruder into the subscriber's premises.

TRANSMISSION OF ALARM—THREE ROUNDS

Now, when any of the windows 32 or door 34, etc., is opened, the armature of relay 30 drops out, the armature contacting contact 30*b* and establishing a connection with contact 5 of the wafer switch by wire 70. When this happens, the motor circuit is completed as follows: From the negative pole of battery 42, to the blade of rotor 22, contact or terminal 5, wire 70, contact 30*b*, armature contact 30*a*, wire 72, thru motor 10 and back to the posiitve pole of battery 42. Contacts 6, 7, 8, 9, and 10 of wafer switch 14, as are contacts 2 and 4, are connected together and to line 66 so that as the rotor blade reaches terminal or contact 6, and then terminals 7, 8, 9, and 10, a bypass for the motor circuit is established to maintain rotation of the motor for three revolutions, thereby causing the signal transmitter to alarm the central office by reason of the transmission of the three rounds of signals. When the trailing edge of the rotor blade leaves contact 10, it centers on contact 1, and the motor stops.

It will be remembered that when the blade of rotor 22 of the wafer switch left contact 1 the coil of relay 36 became deenergized thereby cocking the circuit to alarm 18 via contacts 36*a* and 36*b*, but the circuit for the alarm is not completed until at the close of transmission of the three alarm rounds. Then, an then only, will the circuit to the alarm 18 be closed via terminal 1 of the wafer switch. Thus intruders at the subscribers' station are not aware of untoward happenings, so far as they are concerned, until after the central office had been notified. The local delayed alarm is set off to apprise persons near the local subscriber's establishment that there is something amiss at the establishment.

Obviously, when the barrel switch is again turned to position 1, the parts are restored to the inoperative position of FIG. 1.

What is claimed is:

1. In an intruder alarm system for a premises, a code transmitter, a motor for driving the same, and a switching system at the premises including an exit means controlled switch, means initiated upon opening of the exit means controlled switch to cause the motor to operate to thereby operate the transmitter for a cycle of operation, means initiated upon a subsequent closure of the exit means controlled switch to again operate the transmitter for another cycle of operation and means operated upon opening of the circuit in which the exit means controlled switch is located to further operate the motor and its transmitter for a predetermined operation.

2. In an intruder alarm system as set forth in claim 1, further means comprising an alarm at the premises and means initiating the operation of the alarm near the end of said predetermined operation of the motor.

3. An intruder alarm system as set forth in claim 1 in which the exit means controlled switch is in a supervisory circuit leading to a central office.

4. A system as set forth in claim 3 in which the supervisory circuit includes a relay energized when the supervisory circuit is closed and which, when deenergized, enables its relay contacts to complete a circuit to the motor to initiate movement thereof.

5. An intruder alarm system including a source of potential, a motor and a code tarnsmitter driven thereby, a stepping switch driven by said motor, a three pole four position switch, and first and second relays, the four position switch including for each position a contact for each of the poles, the contacts in the first position being dead contacts, the contacts in the second position closing a circuit including the source of potential to an alarm, the contacts in the third position, via a first and second pole of the four position switch, closing a circuit including the source of potential to a coil of one of the relays to open its relay contacts to disable the alarm circuit, said contacts being normally in series with said alarm, the contacts in the third position further closing a circuit via the third pole to the coil of the second relay, the coil of said second relay being in circuit with at least one series connected switch and with terminals leading to equipment in a central office, the contacts in the fourth position, via a first pole and the armature contact of the first relay and the second pole, maintaining the coil of said first relay energized and the alarm circuit disconnected and the third pole maintaining the circuit to the coil of the second relay energized, for causing, when the relay coil of said second relay is deenergized, a completion of the circuit to the motor.

6. A system as set forth in claim 5 in which an indicator is incorporated into the circuit including the second relay to indicate the status of energization thereof.

7. A system as defined in claim 5 in which the alarm is of an audible character.

8. An intruder alarm system as set forth in claim 5 in which the stepping switch is a ten contact switch, the first contact being connected to the first pole of the three pole four position switch, the second, fourth and sixth through tenth contacts being connected together and to the armature contact of the second relay. The third contact being connected to the contact of said second relay which is closed upon by said armature contact when the second relay is energized and the fifth contact being connected to that contact of said second relay which the armature contact engages when the second relay is deenergized.

9. A system as set forth in claim 8 in which a diode connects one end of the coil of the first relay with a normally open contact of said first relay and a second diode connects the same normally open contact with a normally closed contact of said second relay, and through the armature contact of said second relay with the motor and via the motor with the battery.

10. A system as set forth in claim 9 in which the resistance of the coil of the first relay is of a magnitude such that when connected in series with the battery and the motor, no effective energization of the motor occurs.

References Cited

UNITED STATES PATENTS 3,138,792 6/1964 Jenkins et al. -------- 340—276

THOMAS B. HABECKER, Primary Examiner

J. M. BOBBITT, Assistant Examiner

U.S. Cl. X.R.

340—214, 409, 276